US008528065B2

(12) United States Patent
Ramos Robles et al.

(10) Patent No.: US 8,528,065 B2
(45) Date of Patent: Sep. 3, 2013

(54) MEANS AND METHOD FOR SINGLE SIGN-ON ACCESS TO A SERVICE NETWORK THROUGH AN ACCESS NETWORK

(75) Inventors: Luis Ramos Robles, Coslada (ES); Avelina Pardo Blazquez, Madrid (ES); Jesus de-Gregorio-Rodriguez, Madrid (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1105 days.

(21) Appl. No.: 12/491,563

(22) Filed: Jun. 25, 2009

(65) Prior Publication Data

US 2009/0265554 A1 Oct. 22, 2009

Related U.S. Application Data

(63) Continuation of application No. 10/596,863, filed as application No. PCT/EP03/14978 on Dec. 29, 2003, now abandoned.

(51) Int. Cl.
*G06F 7/04* (2006.01)

(52) U.S. Cl.
USPC .................. 726/8; 713/168; 380/44; 380/259

(58) Field of Classification Search
None
See application file for complete search history.

(56) References Cited

U.S. PATENT DOCUMENTS

| 6,253,327 | B1 * | 6/2001 | Zhang et al. ..................... 726/14 |
| 6,571,289 | B1 * | 5/2003 | Montenegro .................. 709/227 |
| 2003/0171112 | A1 * | 9/2003 | Lupper et al. .............. 455/414.1 |
| 2004/0225878 | A1 * | 11/2004 | Costa-Requena et al. .... 713/150 |
| 2007/0130471 | A1 * | 6/2007 | Walker Pina et al. ......... 713/182 |

OTHER PUBLICATIONS

"Cisco ITP MAP Gateway for Public WLAN SIM Authentication and Authorization," Cisco Systems, pp. 1-13, Copyright 1992-2003.*
Pashalidis, A, et al. "Using GSM/UMTS for Single Sign-on", IEEE Proceedings, Oct. 26, 2003, pp. 138-145.*
3GPP $3^{rd}$ Generation Partnership Project: Technical Specification Group Service and System Aspects: 3G Security. Wireless Local Area Network (WLAN) Interworking Security (Release 6), *TS 33.234 (Nov. 2003). XP002282973.
Matsunaga. Y. et al. Secure Authentication System for Public WLAN Roaming Sep. 19. 2003, San Diego, California, USA. XP001046692.

* cited by examiner

*Primary Examiner* — Kaveh Abrishamkar
(74) *Attorney, Agent, or Firm* — Roger S. Burleigh (57) ABSTRACT

The present invention provides means and method for Single Sign-On authentication of a user accessing a service network through an access network when the user has been already authenticated by a core network where the user holds a subscription. Therefore, a number of means are provided in different entities distributed between the core network and the service network, as well as in the user's equipment, for carrying out the proposed method. The Single Sign-On authentication takes place upon matching in the service network a shared key for the user submitted from the core network with another shared key for the user derived at the user's equipment.

24 Claims, 3 Drawing Sheets

MEANS AND METHOD FOR SINGLE SIGN-ON ACCESS TO A SERVICE NETWORK THROUGH AN ACCESS NETWORK

CROSS-REFERENCE TO RELATED APPLICATIONS

This application is a continuation of U.S. application Ser. No. 10/596,863, filed Mar. 12, 2007 now abandoned, which was the National Stage of International Application No. PCT/EP03/14978, filed Dec. 29, 2003, the disclosure of which is incorporated herein by reference.

FIELD OF THE INVENTION

The present invention generally relates to Single Sign-On services for a user accessing a service network of a network operator through an access network, the user having been previously authenticated for accessing the access network by a core network of the network operator. More specifically, the invention relates to means and method for Single Sign-On authentication purposes in the above scenario.

BACKGROUND

A mobile network operator wanting to offer a Wireless Local Area Network (WLAN) access to its users likely wants to use SIM-based authentication procedures for this access, so that the users have a single security token, such as a SIM card may be, for different access technologies while maintaining a uniform level of security. A Wireless Local Area Network (WLAN), where users of a mobile network operator may access through, is referred to as a WLAN access network. WLAN access protocol is generally governed by IEEE 802.11 protocol specification.

The WLAN access network itself may belong to a mobile network operator (hereinafter referred to as MNO), or to some other operator such as a WLAN Internet Service Provider. Irrespective of the operator owning the WLAN access network, user authentication is traditionally performed in a core network (CN) of the MNO where the user holds a subscription (namely the MNO core network, and hereinafter abbreviated as MNO-CN). An exemplary MNO-CN might be a GSM core network, a GPRS core network, or a UMTS core network, amongst others.

During the authentication of a user by an MNO-CN a number of entities are involved, such as an Authentication Gateway (AG) receiving an access request originated by the user, fetching authentication vectors (AV) for authenticating the user from a Home Location Register (HLR), and granting access to the user once said user has been successfully authenticated. The Authentication Gateway (AG) generally authenticates a user through a challenge-response mechanism, such as the Authentication and Key Agreement (AKA) suggested in rfc33 may be, though other authentication procedures may be applied as well. Apart from these entities, there is generally provided an Authentication Centre (AuC) entity in charge of generating authentication vectors for a number of users, and to be provided to the HER upon request.

In operation, once a user has gained access to the WLAN access network and has been thus authenticated, the user may try to gain access to services available in a service network (SN), said service network (SN) may in particular belong to the mobile network operator (hereinafter referred to as MNO-SN). At present, provided that the user accesses this MNO-SN through a WLAN access network, the user has to be authenticated by the MNO-SN even though the WLAN access network had already authenticated the user. For the sake of clarity, a descriptive distinction is worthwhile between an 'access level authentication' and a "service level authentication' for a user. The former being the user authentication carried out by the core network (CN) before granting the user access to the access network, whereas the latter being the user authentication carried out by the service network (SN) before granting the user access to services in said service network.

An exemplary teaching of this 'service level authentication' carried out by a sort of service network is described in the University paper "Using GSM/UMTS for Single Sign-On" by Andreas Pashalidis and Chris Mitchell, Information Security Group, Royal Holloway University of London. In this paper, the main components are said to be a User System (US) consisting of a network access device, a SIM card and a SIM card reader) a Service Provider (SP), which in the context of this paper is any entity that provides some I kind of service or content to a user; and the GSM operator's Authentication Centre (AuC).

The University paper introduces a concept of Single sign-on (SSO) as a technique where users authenticate themselves only once to a trusted Authentication Service Provider (ASP), and are automatically logged into the SPs they subsequently use, without necessarily having to reauthenticate each time. Under this SSO concept, an SP needs some form of notification from the ASP that indicates the user's authentication status. These notifications are termed authentication assertions.

The proposal made in this University paper for SSO starts when the user requests a service from the SP. The process has a first step where the SP sends a random value (RAND) towards the US; a second step where the SIM in said US computes a ciphering key Kc as a function (GSM algorithm A8) of a secret user key Ki and the given RANDi a third step where the US computes another final code (MAC, SHA-I) using this ciphering key Kc on the SP identifier (SPID); a fourth step where the US returns back to the SP a user's identifier (IMSI) and the computed MACKC(SPID); a fifth step where the SP transmits this answer along with the RAND to the AuCi a sixth step where the AuC finds the secret user key K corresponding to the user's identifier (IMSI) and computes a ciphering key Kc as a function (GSM algorithm A8) of the secret user key Ki and the given RAND; a seventh step where the AuC also computes a MACKC(SPID) with the ciphering key Kc previously computed, and checks whether the received MACKC(SPID) matches the one lately calculated; and an eighth step where the AuC returns to the SP an authentication assertion indicating a valid authentication of the user when the above matching occurs or an authentication failure otherwise. Now, the SP has got an authentication assertion so that further authentications are not needed under the SSO concept presented in this paper.

A first teaching in this University paper is that an SP, namely "any entity that provides some kind of service or content to a user" in its own wording, always triggers a sort of explicit and complete GSM authentication procedure, as shown in this paper, with the SP generating the RAND value' triggering the authentication procedure, and acting as an i intermediate entity between the user equipment and the authentication entity of the home core network, the latter carrying out the explicit and complete GSM authentication procedure. The scenario in this University paper may be similar to the one described as initiating this description if a reader assumes the SP as an entity in the service network (SN) receiving service requests from users.

However, even though this paper cites a WLAN access as a possible interconnection, nothing is described about a sort of previous 'access level authentication' of the user with its own mobile network. Moreover, assuming that the user is connected to the mobile network when accessing the SP, the user should have been previously authenticated by its mobile core network before being granted such access. There is no description in this respect in the University paper, and the concept of SSO seems to apply only after having successfully authenticated the user at an SP, or at an entity of the service network. That is, the SSO seems to apply only after having carried out an explicit 'service level authentication' for the user.

A second teaching of this University paper is that the authentication procedure may be carried out between the US and a UMTS/3GPP network, having the SP as an intermediate entity transmitting the challenge from the AuC towards the US, and the response from the US towards the AuC, and finally receiving the authentication assertion from the AuC if the user had been successfully authenticated. As for the first teaching commented above, an explicit and complete authentication of the user is carried out at request from, or with participation of, the SP where the user has accessed.

There is, however, no teaching in this Paper in respect of applying SSO for a user who had been authenticated before, when accessing other network or other network domain. In particular, there is no teaching on whether a user had carried out a previous 'access level authentication' through an access network such as WLAN, and there is no teaching on how this 'access level authentication' may be re-used as a further 'service level authentication' when accessing the service network within a broader SSO principle.

Moreover, even though the University paper states that a user authenticates only once to a trusted Authentication Service Provider (ASP) and is automatically logged into the Service Provider that the user further uses, there is no enabling disclosure of how this can be carried out. In this respect, the paper only cites that the AuC and the US need to agree on the use of a Message Authentication Code (MAC) function, which is further used to compute a MACKC(SPID) submitted from the SP to the AuC for checking whether the user had been authenticated. In accordance with the teaching in "Applied Cryptography", by Bruce Schneier, ISBN 0-47 1-1 1709-9, a message authentication code (MAC), also known as a data authentication code (DAC), is a one-way hash function acting on an input with the addition of a secret key (Section 18. 14), wherein a one-way means that there is no manner to derive the inputs to the function from the output and thus there is no means for verifying that a user had been already authenticated other than repeating the authentication mechanism and comparing the result offered with the one received. Thereby, there is no applicable teaching in this University paper for re-using a previous access level authentication when accessing the service network. Furthermore, if the user attempts to access a service in a second SP, said second SP having a different SPID, the previous complete explicit authentication would have to be repeated again to produce a new MACKC(SPID) for said different SPID, since the previous assertion stored in the first SP does not seem to be known and applicable to the 1O second SP.

In this context, Single Sign-On (SSO) is for the purpose of the present invention an emerging principle that enables users to access different networks, or different network domains, without explicitly authenticating such users for each particular different network, or different network domain, once the users had been already authenticated. This principle implies that a user is authenticated only once at a given network, or given network domain, and the resulting authentication is valid for entrance to other networks, or network domains. In other words, the purpose of SSO is to allow users to securely access different networks and network domains, without being explicitly authenticated every time.

A special case occurs when a same entity, for example a mobile network operator (MNO), fully controls the access level authentication, wherein the user has been authenticated with the core network (CN) of the MNO, and the MNO may trust on this authentication to allow the user further accessing to the service network (SN) of the MNO. For instance, a user may be authenticated with the MNO-CN in order to gain access to a General Packet Radio Service (GPRS) from where the MNO-SN is accessible, and the MNO-SN relies on this authentication since the GPRS network is a trusted network from the mobile network operator perspective.

More specifically, and illustrative for the known GPRS technique commented above, when a user has gained access to the MNO core network (MNO-CN) through a GPRS access network and has been thus authenticated, the user is assigned an IP address that is trustable, since all equipment in the IP infrastructure of the mobile network operator is supposed to have anti-spoofing capabilities in order to prevent the malicious use of fake IP addresses. That is, the IP address assigned to the user can be used to track that the user having accessed to the MNO core network (MNO-CN) is the same as the one now accessing the MNO service network (MNO-SN). This identification is notified by a Gateway GPRS Support Node (GGSN) to an entity in the MNO service network, such as an Authentication-Authorization-Accounting (AAA) server. In short, the assignation of an IP address by the MNO core network (MNO-CN) to identify an authenticated user is a key aspect of the SSO solution for a typical MNO service network accessed through a trusted access network such as a GPRS network.

Under this special case, the MNO service network (MNO-SN) can only rely on the MNO core network (MNO-CN) authentication if the access network, which the user is accessing through, provides data origin authentication. This is the case, for example, when the user is accessing through a GPRS access network. In this context, data origin authentication means that for any data received from the access network, such as the above IP address that the user is assigned, the claimed originator of said data can be considered authentic, irrespective of the originator.

However, a WLAN access network is not able to assign IP addresses in a trustable way for the MNO, since the WLAN infrastructure usually does not belong to the MNO, and the anti-spoofing capabilities presently existing in a GPRS access network cannot be expected to be available in a WLAN access network. Consequently, an IP address assigned to an authenticated user and received at an MNO service network (MNO-SN) from a WLAN access network cannot be accepted as a token to track the presence of said user in the MNO service network and, hence/the traditional mechanism to support SSO authentication cannot be used.

At this stage, attention is called to the University paper commented above wherein no mention appears in respect of re-using or trusting a possibly previous access level authentication of the user with its own core network while likely accessing the serving entity (SP), namely accessing an entity in the service network, through a WLAN access network.

The present invention is aimed to provide means and method for offering a broader Single Sign-On mechanism to users of a mobile network operator when the users are accessing a service network through a non-trusted access network, said users having been previously authenticated by the core network of the mobile network operator.

Moreover, this aim also ambitions to make this means and method for offering the broader Single Sign-On mechanism also applicable to users of a fixed network operator under a single inventive concept.

Therefore, an object of the present invention is the provision of an SSO mechanism that allows the service network to trust on an authentication token received through a non trusted access network and intended to prove that a user had been previously authenticated.

It is a further object of the present invention that this SSO mechanism may also be used where the access network is a fully trusted access network so that distinguishing whether an access network may or may not be trusted by the service network becomes a superfluous discussion.

SUMMARY OF THE INVENTION

The above aim is accomplished in accordance with the present invention providing users a SSO access to a service network through an access network where users have been authenticated by a core network where they hold a subscription.

The apparatus of the present invention, which is called Authentication Gateway in the instant specification, is in accordance with the invention arranged for receiving an access request in a telecommunication core network from an entity in an access network where a user with a user's equipment accesses through. The user is subscriber of the telecommunication core network and identified by a user's identifier included in the access request. Such an apparatus generally comprises:—means for carrying out an authentication procedure with the user's equipment through the access network in order to authenticate the user; and-means for computing at least one secret user's key (Kc) usable as cryptographic material).

This Authentication Gateway comprises in accordance with the invention:—means for deriving from the cryptographic material a user's shared key intended for SSO purposes) and-means for sending said user's shared key along with the user's identifier towards a session manager serving a service network.

The Authentication Gateway preferably comprises means for being notified that a session at the access level has been established, namely an access session, this notification triggering the sending of the user's shared key towards the session manager serving a service network. Moreover, this Authentication Gateway may preferably comprise means for being notified that a session at the access level has been terminated, and means for forwarding this notification towards the session manager serving the service network in order to inactivate a current master session for the user.

The session manager used in the present invention is an entity serving a service network for SSO purposes and arranged for managing a session record for a user accessing the service network through an access network. For the purpose of the present invention, the user has been previously authenticated by a telecommunication core network where the user holds a subscription.

The session manager in accordance with the invention also comprises:—means for receiving a first user's shared key and a user's identifier from the core network for SSO authentication purposes, this first user's shared key obtainable during the authentication of the user by the core network;—means for creating a master session for the user that comprises the user's identifier and the received first user's shared keys and means for checking whether a second user's shared key derived at the user's equipment matches the first user's shared key included in the master session for the user.

The session manager may advantageously include means for creating a service session to index the master session, in case of matching first and second user's shared keys, this service session intended as a token of a successful SSO user authentication. Moreover, this session manager may further include as well means for verifying whether a service session indexes an active master session for a user, in order to determine if a previous SSO authentication is still valid.

Additional advantages may be obtained by providing a session manager wherein the means for checking, whether a second user's shared key derived at the user's equipment matches the first user's shared key included in the master session, comprises means for processing the first user's shared key to obtain a first key code to be matched against a second key code originated from the user's equipment.

In operation, the above session manager co-operates with the apparatus of the present invention, which is called in this instant specification Service Access Authentication Node. The distribution of features between the above session manager and this apparatus is rather based on the current trends and standards though other arrangements between this couple may be implemented, as further indicated in the preferred embodiments section.

Such apparatus intended for receiving a request from a user accessing a telecommunication service network through an access network with a user's equipment, once the user has been already authenticated by a telecommunication core network where the user holds a subscription, the request traditionally includes a user's identifier to identify the user. This apparatus comprises in accordance with the invention:—means for verifying whether an active service session is indicated in the request from the user's equipment; means for assessing that a user's shared key is stored in the user's equipment; and-means for determining in co-operation with the above session manager, which is serving the service network for SSO purposes, whether the user's shared key at the user's equipment matches the one stored in the master session for said user.

This apparatus preferably also comprises means for obtaining a service session for a user from the session manager serving the service network for SSO purposes.

Moreover, the apparatus may further include means for generating an SSO cookie to be submitted to the users equipment, this SSO cookie comprising the service session.

Further, the apparatus may also comprise means for receiving an SSO cookie from the user's equipment, the SSO cookie indicating a service session for the user.

Additional advantages may be obtained by providing the apparatus with means for downloading an SSO plug-in towards the user's equipment, the SSO plug-in running for confirming back the user's shared key.

Still further advantages may be obtained by providing an apparatus wherein the means for assessing that a user's shared key is stored in the user's equipment includes means for receiving from the user's equipment an element selected from a key code obtainable by processing the user's shared key at the user's equipment; and the user's shared key.

This latest advantage cited above may be enhanced if the apparatus further comprises means for submitting the received element to the co-operating session manager serving the service network for SSO purposes.

Different scenarios may turn up as natural fields where the invention, in general, and this apparatus coupled to the session manager, in particular, may be applied.

For instance, this apparatus may be used as an HTPP Proxy receiving service requests from users accessing a service network in a Walled-Garden SSO model.

Also for instance, this apparatus may be used as an authentication node of an Identity Provider where a credential request is received from a user accessing a service of a Service Provider in a Federated SSO model.

In order to effectively carry out the objects of the invention, there is provided a user's equipment. A user's equipment conventionally usable by a user with a subscription in a telecommunication network, is arranged to access a telecommunication service network through an access network, and includes: means for carrying out an authentication procedure to authenticate the user with a core network, where the user holds the subscription, through the access network; and—means for computing at least one secret user's key usable as cryptographic material, such as a ciphering key for encryption purposes, amongst other keys.

The user's equipment in accordance with the invention also comprises:—means for deriving from the cryptographic material a user's shared key intended for SSO purposes) a repository for storing the user's shared key; means for confirming the user's shared key stored at the user's equipment towards an entity in the service network.

Additional advantages, as those described above for other entities, can be obtained by providing a user's equipment wherein the means for confirming the user's shared key stored at the user's equipment includes means for downloading an SSO plug-in from an entity in the service network, the SSO plug-in running for confirming back the user's shared key.

Moreover, additional security can be ensured by providing a user's equipment wherein the means for confirming the user's shared key stored at the user's equipment includes means for processing the user's shared key to obtain a key code to be transmitted to an entity in the service network.

In order to simplify further subsequent accesses of the user to the service network within the SSO mechanism in accordance with the invention, the user's equipment further comprises means for receiving an SSO cookie from an entity in the service network during the first access. This SSO cookie intended to be included in all further service requests from the user's equipment as an SSO token.

Apart from the above means describing the structural part of the invention, there is also provided a method for supporting Single Sign-On services for a user with a user's equipment arranged for accessing a telecommunication core network and service network through an access network. The user being identified as subscriber of the telecommunication core network when accessing the access network, and the method traditionally comprising the steps of: carrying out an authentication procedure for the user between the core network and the user's equipment;—computing at an entity of the core network at least one secret user's key usable as cryptographic material; and computing at the user's equipment at least one secret user's key usable as cryptographic material.

The method, in accordance with the invention, also includes the steps of:—deriving a first user's key intended for SSO purposes from the cryptographic material at an entity of the core network; deriving a second user's key intended for SSO purposes from the cryptographic material at the user's equipment; creating a master session for the user at an entity in the service network, the master session comprising a user's identifier and the first user's key; confirming the second user's shared key stored at the user's equipment towards the entity in the service network; verifying whether the second user's shared key matches the first user's shared key for the user at the entity in the service network; and granting access to the requested service in the service network on matching the first and second user's shared keys.

Additional advantages can be obtained by providing this method in such a manner that the step of verifying the matching of the first and second user's shared keys further includes a step of creating a service session to index the master session, this service session intended as a token of a successful SSO authentication. Moreover, this method may further include a step of generating an SSO cookie to be submitted to the user's equipment, the SSO cookie comprising the service session. Furthermore, the method may further comprise a step of verifying whether an active service session is indicated in the request from the user's equipment by examining whether an SSO cookie is received.

In order to allow additional advantages on the provision of a usable user's equipment, the method is enhanced if the step of confirming the second user's shared key stored at the user's equipment includes a step of downloading an SSN plug-in from an entity in the service network, said SSO plug-in running for confirming back the user's shared key.

As cited above, additional security can be ensured by providing a method wherein the step of confirming the second user's shared key stored at the user's equipment, includes a step of processing the user's shared key to obtain a key code to be transmitted to an entity in the service network. This method being more efficient if the step of verifying whether the second user's shared key matches the first user's shared key includes a step of processing at an entity of the service network the first user's shared key to obtain a first key code to be matched against a second key code originated from the user's equipment.

Preferably, the method is carried out in such a manner that the step of creating a master session for the user at the entity in the service network includes a step of receiving the first user's key from an entity of the core network.

Moreover, an advantageous implementation may be achieved if the step of creating a master session for the user at the entity in the service network includes a step of initiating an access session when the user accesses the access network.

BRIEF DESCRIPTION OF DRAWINGS

The features, objects and advantages of the invention will become apparent by reading this description in conjunction with the accompanying drawings, in which.

DETAILED DESCRIPTION OF PREFERRED EMBODIMENTS

The following describes some preferred embodiments for offering a Single Sign-On mechanism to users of a network operator when accessing a service network (SN) of the network operator through an access network, such as a WLAN access network, wherein said users had been previously authenticated by the core network (CN) of the network operator.

The present invention presents several aspects in connection with the mechanism carried out between user equipment (UK) and different entities at the core network (CN) and at the service network (SN) of a network operator.

For the purpose of the present invention, a user equipment (UK) is a terminal, which may be an integral device I or a number of interconnected devices, arranged for accessing a network where the user holds a subscription and for accessing another access network such as a WLAN network; the user's equipment comprising an access authentication client responsible for carrying out an authentication procedure at the user side with a core network (CN) of the network where the user holds the subscription, and a web browser also called user client and responsible for accessing services in a service network (SN). Cryptographic material is generated at the user side by the access authentication client during this access level authentication procedure to be further used in accordance with the present invention.

In particular, said network where the user holds a subscription may be a mobile network. In that case, the access level authentication is preferably carried out by a SIM-based authentication procedure. Therefore, the user's equipment also comprises a SIM card with subscription data along with a SIM card reader.

On the other hand, said network where the user holds; a subscription might also be a fixed network, in which case the user's equipment may be configured depending on the particular authentication procedure that the operator wants to be carried out by the access authentication client. As for a mobile network, the authentication procedure between a user and a fixed network may be possibly based on the use of a particular user card with relevant subscription data, and the user's equipment thus including a corresponding card reader) or it may be possibly based on the use of a user's identity and a user's password, where the cryptographic material may be generated from said couple of user's identity and a user's password.

An interesting advantage of having a separable card reader from the user's equipment, in case the authentication procedure is SIM-based or the like, is that once the user has been authenticated by the core network (CN), and for SSO purposes in accordance with the invention, the card can be extracted and the card reader disconnected during further establishment of a service session with the service network.

Figure 1:
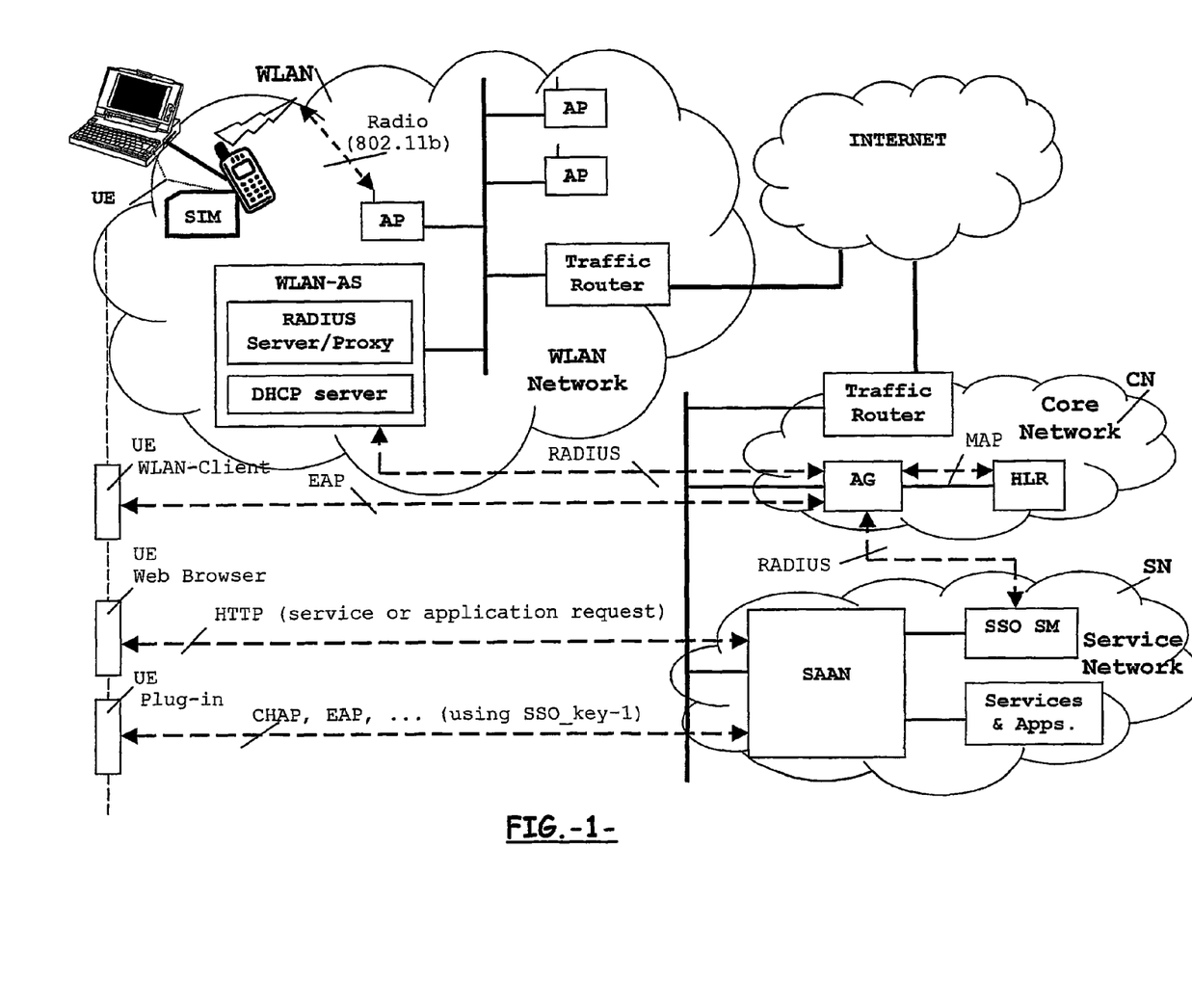
FIG. 1 presents a basic diagram showing the entities and main interfaces involved to carry out an SSO authentication when a user with a user's equipment accesses a service network via a WLAN access network, the user having been authenticated before by the core network where the user holds a subscription.

In short and illustrated in FIG. 1, the object of the invention is achieved by authenticating a user at access level, for instance at the WLAN access network, thanks to an authentication procedure carried out by using core network (CN) infrastructure. This core network, as above commented, may be a mobile network or a fixed network depending on the appropriate choice of an applicable authentication procedure and corresponding protocol. Nevertheless, and for the sake of simplicity, most of the embodiments dealt with throughout this description refer to a mobile network operator (MNO) for illustrative purposes and without aiming to restrict the scope of the invention to such mobile network environment.

During this authentication procedure, a shared key (SSO_key-I; SSO_key- 2) is respectively derived from; cryptographic material obtainable from the authentication procedure between an Authentication Gateway (AG) at the core network (CN) and the user's equipment (UE). This shared key is, on an immediate step, stored (SSO_key-2) at the user's equipment (UK) and, on a further step, submitted (SSO_key-I) from the Authentication Gateway (AG) towards an entity serving the service network (SN) for SSO purposes, such entity called Session Manager for SSO (SSO_SM) in this instant specification, and responsible for managing session records for users who had carried out a successful authentication procedure with the core network (CN). The I shared key (SSO_key-2) stored at the user's equipment (UK) is further included in a first service request message, and intended to be an authentication token when the user access the service network (SN), said token being checked versus the corresponding one (SSO_key-I) stored in the Session Manager for SSO (SSO_SM), so that a new explicit user authentication at the service network (SN) is not required.

In accordance with a first aspect of the present invention, there is provided a currently preferred embodiment to achieve a SIM-based authentication for a WLAN user through an authentication procedure with the core network (CN).

Figure 2A:
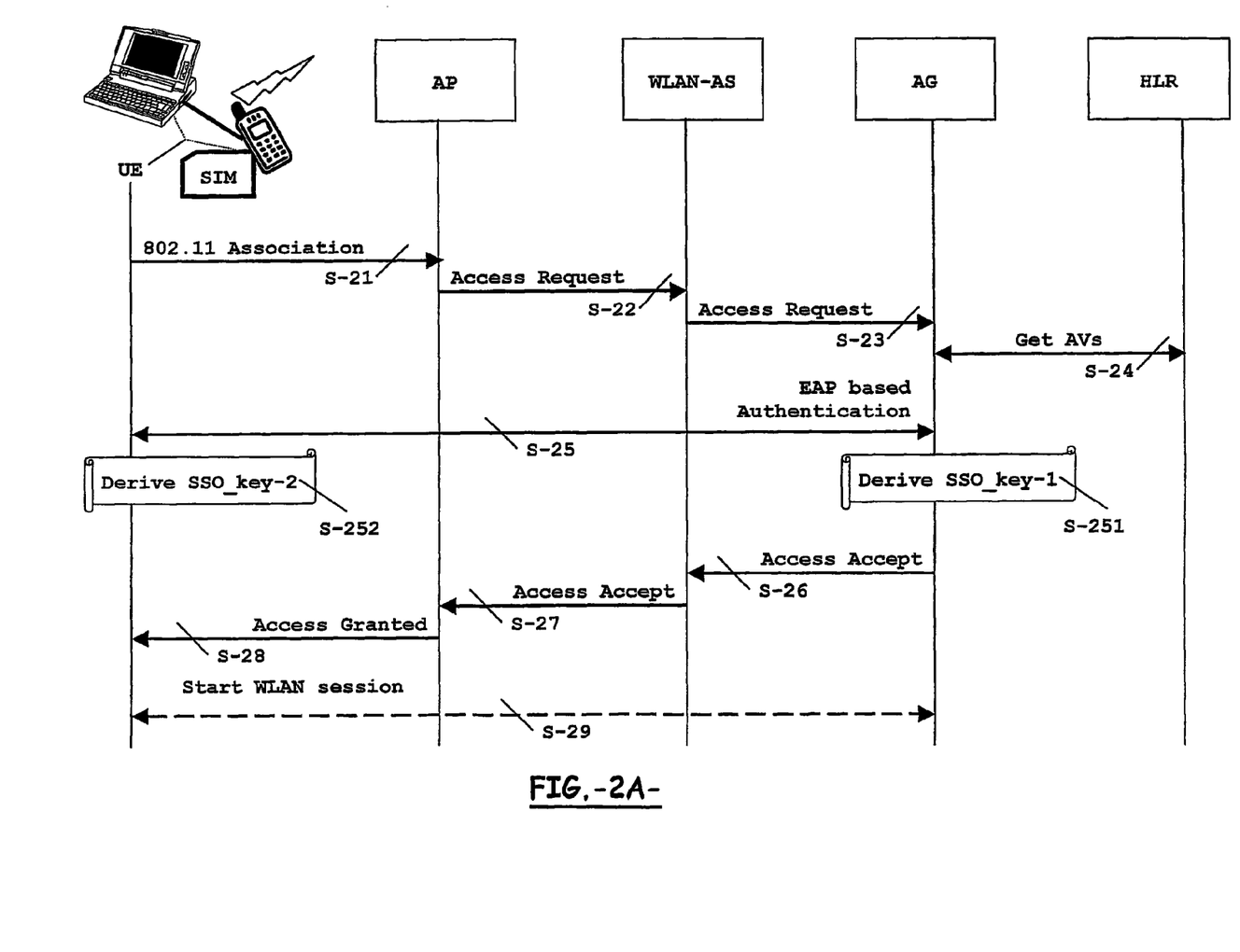
FIG. 2A illustrates the sequence of actions carried out by a user's equipment accessing the core network (CN) where the user holds a subscription through a WLAN access network in order to be authenticated by said core network.

Therefore and as shown in FIG. 2A, a user's equipment (UK) establishes an 802.II association (S-21) with an Access Point (AP), the association including a user's identifier that allows further identification of the user by the core network (CN). An Access Point (AP) in a WLAN network generally enforces an access control and, given that RADIUS is a protocol suitable within both WLAN and core network (CN) infrastructures, the Access Point (AP) acts as RADIUS client towards said WLAN infrastructure. In this respect, other; protocol arrangements such as Diameter may be used instead of RADIUS without significant differences for the purpose of the present invention.

Thus, a RADIUS access request including the user's; identifier is sent (S-22) to a RADIUS server or RADIUS proxy belonging to the WLAN infrastructure, such as a so-called WLAN Access Server (WLAN-AS). This WLAN Access Server (WLAN AS) may perform authentication for local users, thus acting as a RADIUS server, and is an edge entity acting as a RADIUS proxy for communication with the core network (CN), the latter responsible for triggering the authentication for the user.

The WLAN Access Server (WLAN-AS), as detecting that the user is subscriber of a Mobile Network Operator (MNO), forwards (S-23) the access request towards an Authentication Gateway (AG) located at the MNO core network (CN).

The Authentication Gateway (AG) in the MNO core network, which may be acting as a RADIUS server, is arranged for carrying out a sort of SIM-based authentication at the network side. Therefore, the AG obtains (S-24) a number of Authentication Vectors (AV) from a Home Location Register (HLR), such Authentication Vectors likely generated in a dedicated Authentication Centre (AUC) not relevant for the purpose of the present invention.

Then, the AG initiates (S-25) a challenge-response authentication procedure with the user's equipment (UK) by making use of these Authentication Vectors.

The authentication procedure might be based on an Extended Authentication Protocol (RAP), generally known as an EAP-based authentication, where the access authentication client (WLAN-Client) at the user's equipment (UK) is acting as an EAP-client and the Authentication Gateway (AG) as an EAP-server.

During a conventional authentication procedure (S-25) or, more precisely, upon a successful response from the user's equipment (UK) to the challenge, the Authentication Gateway (AG) sends a RADIUS Access Accept (S-26, S-27) message to the RADIUS client (AP), said message transporting an EAP-Success for the access authentication client at the user's equipment (UE). The RADIUS client (AP) in turn grants (S-28) the user access to the WLAN access network.

In accordance with a preferred embodiment, and after having carried out the authentication procedure, the present invention proposes that both user's equipment (UK) and Authentication Gateway (AG), following a shared mechanism, respectively derive (S-252; S-251) on their own a shared key (SSO_key-2i SSO_key-I) for the user, from the cryptographic material obtained as computing a response to the authentication challenge between the Authentication Gateway (AG) and the user's equipment (UE).

For instance, during the authentication procedure explained above when discussing the prior art, a ciphering key (Kc) was obtained for further ciphering purposes. This ciphering key (Kc), as well as other keys obtainable by carrying out an authentication procedure, can be considered as the cryptographic material from where a shared key (SSO_key-2i SSO_key-I) for the user can be computed at both user's equipment (UK) and Authentication Gateway (AG).

Thus, a first shared key (SSO_key-I) computed at the Authentication Gateway (AG) is stored therein in order to be further provided towards the service network (SN), whereas a second shared key (SSO_key-2) computed at the user's equipment (UK) is stored in said user's equipment along with the user's identifier relevant for the access.

Preferably, the shared key (SSO_key-2) is stored in a repository of the user's equipment accessible to other applications. If the user's equipment so permits, a registry of the operating system may be a suitable repository to this end provided that, on the one hand, such registry offers enough security and, on the other hand, such registry offers an easy identification of the shared key to allowed applications.

Alternatively, an access authentication client (WLAN-client), shown in FIG. 1, might as well act as repository to keep locally stored the shared key and user's identifier for the user, and to make them available to other allowed applications via an Application Programming Interface (API).

Moreover, additional security means may be provided in accordance with the invention to ensure that the access to the shared key (SSO_key-2) at the user's equipment is only allowed for a certain number of applications, plug-ins or pieces of software recognizable at the repository in order to prevent that malicious software, such as a Trojan software, could get access to said shared key to be further used as an authentication token.

Once the access level authentication has taken place with an authentication procedure carried out between the access authentication client at the user's equipment (UK) and an Authentication Gateway (AG) at the core network (CN), the user is granted access (S-26, S-27, S-28) to the WLAN access network. At this stage, the Authentication Gateway (AG) receives a RADIUS accounting start message (S-29) initially intended to indicate that the user has initiated a session with the WLAN access network, namely an access session. This message includes a user's identifier, and ends the sequence shown in FIG. 2A where the user accesses via an access network (WLAN) after having been authenticated by the core; network (CN) where the user holds a subscription. The Authentication Gateway (AG) is noticed the end of an access session with the reception of a RADIUS accounting stop message, which is not shown in any drawing.

Figure 2B:
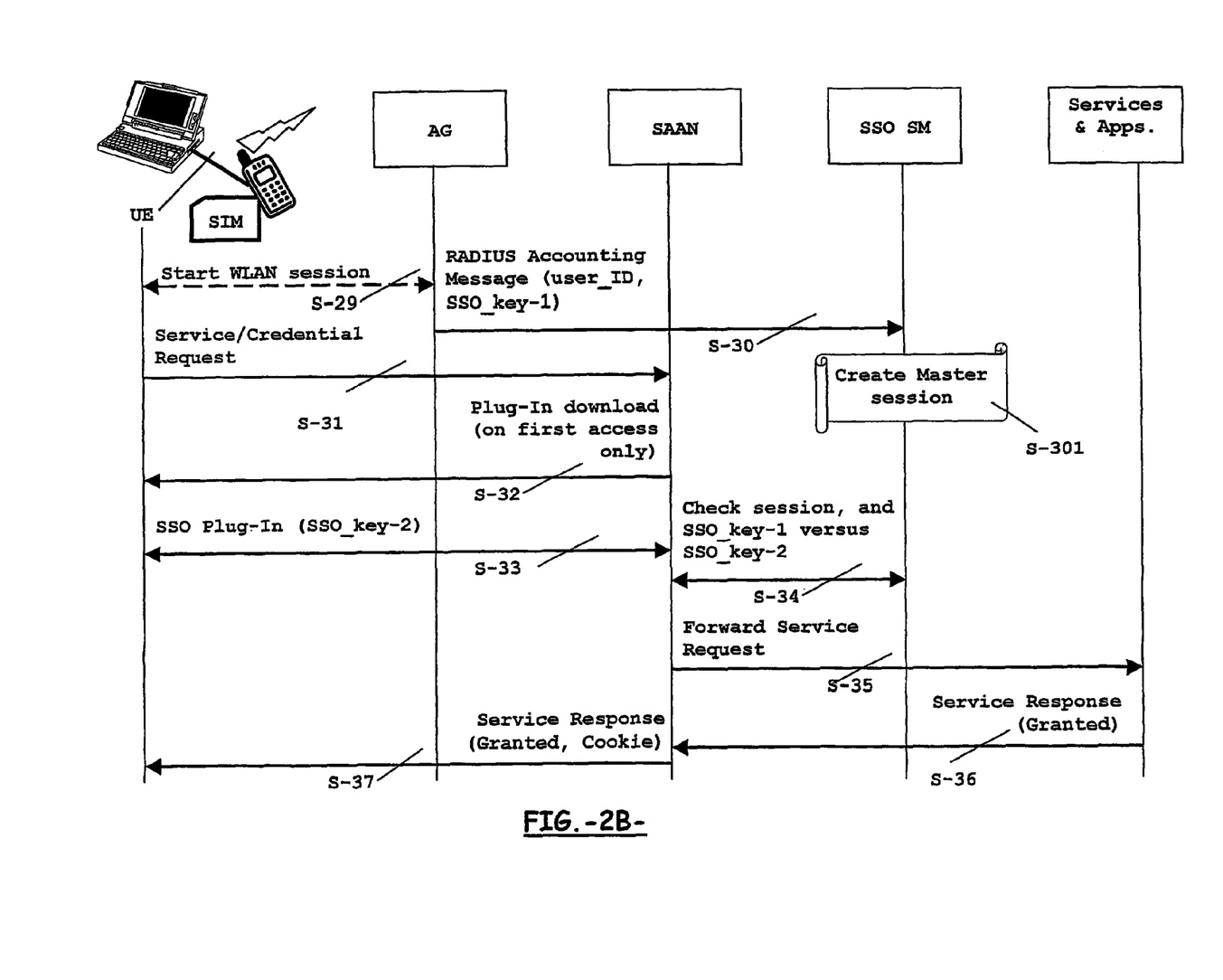
FIG. 2B illustrates the sequence of actions carried out by a user's equipment accessing a service network (SN) through an access network (WLAN) once the user had been authenticated by the core network as shown in FIG. 2A.

As shown in FIG. 2B, when an access session has been initiated (S-29) with the WLAN access network, the Authentication Gateway (AG) forwards this RADIUS accounting message (S-30), after having included in the message said shared key (SSO_key-I) for the user, towards an entity serving the MOO service network (MNO-SN) for SSO purposes, namely the Session Manager for SSO (SSO_SM), and which is responsible for managing session records for users who had carried out a successful authentication The Session Manager for SSO (SSO_SM) then creates a session record (S-301) for the user, which is called master session throughout this instant specification, where both user's identifier and shared key (SSO_key-I) for the user are stored as information of the access session. The Session 24 Manager for SSO (SSO_SM) maintains this master session until receiving a RADIUS accounting stop message initially received in, and forwarded from, the Authentication Gateway (AG) to indicate the end of the session, what is not shown in any drawing.

At this stage the service network (SN) is ready for accepting the user access under an SSO authentication. There are two scenarios where particular aspects of the invention are further described.

In a Walled-Garden SSO model, namely in a scenario where an environment such as a mobile network operator (MNO) controls the user access to web content and services, the user tries to access a service or application belonging to, or controlled by, the mobile network operator where the user holds a subscription. To do so, a web browser at the user's equipment (UK) sends an HTTP service request (S-31) towards] an HTTP Proxy (SCAN) in the MNO service network (MNO-SN). In accordance with an aspect of the present invention, a Service Access Authentication Node (STAN) is provided in the service network (SN) to act as an HTTP Proxy in a Walled-Garden SSO model with new features according to, and for the purpose of, the invention as illustrated in FIG. 1 and FIG. 2B.

On the other hand, in a Federated SSO model where a mobile network operator (MNO) acts as an Identity Provider responsible for authenticating users and authorizing services offered to its users by a number of Service Providers bound by contractual service agreements to the Identity Provider and thus forming a "circle of trust", the user tries to access a service or application belonging to one of said Service Providers. Therefore, this Service Provider must be federated with the MNO, and the service or application may preferably offer an option to perform SSO with the MNO acting as Identity Provider. In accordance with the invention, when the user chooses this option, a web browser in the user's equipment (UK) is re-directed (S-31) to an authentication node of the Identity Provider (SAAN) in order to get a user credential indicating that the user has been authenticated. In accordance with another aspect of the present invention, a Service Access Authentication Node (SAAN) is provided in the service network (SN) to act as the authentication node of the Identity Provider in a Federated SSO model with new features according to, and for the purpose of, the invention as illustrated in FIG. 1 and FIG. 2B.

Thereby, a Service Access Authentication Node (SAAN) represents hereinafter an HTTP Proxy receiving a service request (S-31) from a user in a Walled-Garden SSO model, or an authentication node of the Identity Provider receiving a credential request from a user in a Federated SSO model, as the case might be.

The Service Access Authentication Node (SAAN) may trigger (S-32) an SSO plug-in download towards the user's equipment (UE). This step is only necessary the very first time the user accesses the service network (SN) since an SSOI authentication procedure is required. That is, once the SSO plug-in is available at the user's equipment, there is no need to download it again. In a currently preferred embodiment, when a user tries to access any service for the first time, the Service Access Authentication Node (SAAN) notices there is no service session already established at service level for that user. For example, the Service Access Authentication Node (SAAN) can notice this by the absence of an SSO cookie that will be further explained when the service has been granted within an SSO authentication. In that case, the Service Access Authentication Node (SAAN) initiates the establishment of a session at service level before granting access to the service. This may comprise a number of steps wherein a first step is the download of the SSO Plug-in to the user equipment if it has not been downloaded before. Then, a second step of communicating with the SSO Plug-in, 26 which is running in the user equipment, in order to assess that a shared key (SSO_key-2) is available at the user's equipment, confirming that the user has been previously authenticated at access level.

Alternatively, and not shown in any drawing, a certain piece of software may be included in the user's equipment with an equivalent functionality as provided by the above SSO plug-in.

The SSO plug-in, or the alternative piece of software, is responsible for obtaining the shared key (SSO_key-2) for the user from the repository where it is stored at the user's equipment (UK) along with the user's identifier, and is responsible for communicating (S-33) with the Service Access Authentication Node (SAAN) in order to carry out an SSO authentication. Therefore, the SSO plug-in is arranged for submitting said shared key (SSO_key-2) for the user towards the Service Access Authentication Node (SAAN). Different alternatives are provided for submitting said shared key (SSO_key-2), one the one hand, the shared key may be submitted as such, or encrypted) and, on the other hand, the shared key (SSO_key-2) may be processed to obtain another key code (MAC(SSO_key-2)) to be submitted instead. The process of obtaining the key code might be a MAC or another internal function shared with the service network (SN). This SSO authentication simply implies the recognition that the user had been previously authenticated by a core network (CN) when the user requested access to the WLAN access network.

During this SSO authentication process, the Service Access Authentication Node (SAAN) communicates with the Session Manager for SSO (SSO_SM) in order to address the corresponding shared key (SSO_key-1) stored at the master session for the user, who is identified by the same user's identifier that was used for the access (WLAN) level authentication, and to check that the user has an active master session.

At this stage, it is noticed that the Session Manager for SSO (SSO_SM) might be an integral part of the Service Access Authentication Node (SAAN), so that a mere local communication takes place between different software or hardware elements at the couple formed by the Service Access Authentication Node (SAAN) and the Session Manager for SSO (SSO_SM). Other alternative embodiment might be preferred where the Session Manager for SSO (SSO_SM) receives from the Service Access Authentication Node (SAAN) the shared key (SSO_key-2) received from the user's equipment, checks whether this shared key (SSO_key-2) matches the one stored in the master session (SSO_key-I), namely the one received from the Authentication Gateway (AG) after valid authentication by the core network (CN), and sends back an SSO authentication result to the Service Access Authentication Node (SAAN) indicating a valid authentication in case of matching. In particular, when the Service Access Authentication Node (SAAN) has received a key code (MAC(SSO_key-2)) from the user's equipment, instead of the user's shared key (SSO_key-2), the former is passed to Session Manager for SSO (SSO_SM) where, by applying a same process as in the user's equipment to the shared key (SSO_key-I) stored in the master session, a corresponding key code (MAC(SSO_key-I)) is obtained to be matched against the one received from the user's equipment.

At this stage, in case of matching, a service session is created to index the corresponding master session and including data relevant for accessing the service. A service session may be regarded as a reference indexing the master session for the user, and a number of service related data, which in particular may be stored within the master session. The existence of a service session for a user is interpreted as a proof that the user has successfully passed an SSO authentication within the service network. This service session may be submitted towards the user's equipment in order to be further included by the user's equipment in all subsequent service requests. The service session may be submitted in different ways, for example, as an SSO cookie complying with standard cookies used for HTTP protocol session handling. This SSO cookie comprising the service session, which is considered enough information to index the user's master session in accordance with the invention.

Once the user has been authenticated, the Service Access Authentication Node (SAAN), or the Session Manager for SSO (SSO_SM), depending on the different above embodiments, can enable the user to access the requested service (S-35, S-36, S-37) in a sort of Walled-Garden model, or can provide the requested credential to the user in a sort of Federated model. Moreover, either of these coupled entities, the Service Access Authentication Node (SAAN) and the Session Manager for SSO (SSO_SM), may preferably place the SSO cookie in the browser of the user's equipment so that during subsequent service or credential requests the only check to perform is that the SSO cookie is there, thus precluding ulterior implicit authentication processes based on the shared key (SSO_key-I, SSO_key-2), since the service session can be obtained from the SSO cookie, and the master session indexed thereof.

In this respect, it has to be noticed that the shared key (SSO_key-I, SSO_key-2), having been derived from a cryptographic material obtained during the explicit authentication process carried out between the user's equipment (UK) and the core network (CN), is intended to be used just once, and any further use of the same shared key will be rejected by an entity of the coupled Service Access Authentication Node (SAAN) and Session Manager for SSO (SSO_SM).

The invention is described above in respect of several embodiments in an illustrative and non-restrictive manner. Obviously, modifications and variations of the present invention are possible in light of the above teachings, and any modification of the embodiments that fall within the scope of the claims, with due regard to the description and drawings, is intended to be included therein.

What is claimed:

1. A method for supporting Single Sign-On (SSO) services for a user with a user equipment arranged for accessing a telecommunication core network, where the user is a subscriber, and a service network, where services are provided, through an access network, the method comprising the steps of:

identifying the user as the subscriber of the telecommunication core network at an entity of the access network where the user accesses;

carrying out an authentication procedure for the user between an entity of the telecommunication core network and the user equipment;

computing at the entity of the telecommunication core network a first secret user key usable as cryptographic material;

computing at the user equipment a second secret user key usable as cryptographic material;

deriving a first user shared key for SSO purposes from the cryptographic material at the entity of the telecommunication core network;

deriving a second user shared key for SSO purposes from the cryptographic material at the user equipment;

the entity of the telecommunication core network notifying an entity of the service network that an access session for the user through the access network has been initiated and including the first user shared key for SSO purposes;

creating a master session for the user at the entity of the service network, the master session comprising a user identifier and the first user shared key;

upon the user accessing a service of the service network for a first time, confirming the second user shared key from the user equipment towards the entity of the service network;

verifying at the entity of the service network whether the second user shared key matches the first user shared key for the user; and granting access to the service in the service network on matching the first and second user shared keys.

2. The method of claim 1, wherein the step of verifying further includes a step of creating a service session to index the master session, the service session intended as a token of a successful SSO authentication.

3. The method of claim 2, further including a step of generating an SSO cookie to be submitted to the user equipment, the SSO cookie comprising the service session.

4. The method of claim 3, further comprising a step of verifying whether an active service session is indicated in the request from the user equipment.

5. The method of claim 1, wherein the step of confirming the second user shared key includes a step of downloading an SSO plug-in from the entity in the service network, the SSO plug-in running for confirming back the second user shared key.

6. The method of claim 1, wherein the step of confirming the second user shared key includes a step of processing the second user shared key to obtain a second key code to be transmitted to the entity in the service network.

7. The method of claim 6, wherein the step of verifying includes a step of processing at the entity of the service network the first user shared key to obtain a first key code to be matched against the second key code originated from the user equipment.

8. The method of claim 1, wherein the step of creating the master session for the user at the entity in the service network includes a step of receiving the first user shared key from the entity of the telecommunication core network.

9. The method of claim 1, wherein the step of creating the master session for the user at the entity in the service network includes a step of initiating the access session when the user accesses the access network.

10. An apparatus of a telecommunication core network for supporting Single Sign-On (SSO) services of a service network for a user accessing through an access network, wherein the user is a subscriber of the telecommunication core network, the apparatus comprising:

means for receiving an access request of a user from an entity of the access network where the user with a user equipment accesses through, the access request including a user identifier;

means for carrying out an authentication procedure with the user equipment through the access network in order to authenticate the user;

means for computing a secret user key usable as cryptographic material;

means for deriving from the cryptographic material a user shared key for SSO purposes; and means for notifying an entity of the service network that an access session for the user has been initiated through the access network, the notification including the user identifier and the user shared key for SSO purposes, the user shared key being used by the entity of the service network to verify a match with another user shared key derived by the user to grant access to a service in the service network.

11. The apparatus of claim 10, further comprising means for being notified that the access session at an access level has been established, the notification triggering sending of the user shared key towards the entity of the service network.

12. The apparatus of claim 11, further comprising means for being notified that the access session at the access level has been terminated, and means for forwarding the notification towards the entity of the service network in order to inactivate a current master session for the user.

13. An apparatus of a service network for a user accessing Single Sign-On (SSO) services through an access network, the user having been authenticated by a telecommunication core network where the user holds a subscription, the apparatus comprising:

means for receiving a notification from an entity of the telecommunication core network indicating that an access session for a user with a user equipment has been initiated through an access network, the notification including a user identifier and a first user shared key derived from a first secret user key at the entity of the telecommunication core network for SSO purposes;

means for creating a master session for the user, the master session comprising the user identifier and the first user shared key;

means for confirming with the user equipment, upon the user accessing a service of the service network for a first time, a second user shared key derived from a second secret user key at the user equipment for SSO purposes; and means for checking whether the second user shared key derived at the user equipment matches the first user shared key included in the master session for the user.

14. The apparatus of claim 13, further including means for creating a service session to index the master session, in case of matching first and second user shared keys, the service session intended as a token of a successful SSO user authentication.

15. The apparatus of claim 14, further including means for generating an SSO cookie to be submitted to the user equipment, the SSO cookie comprising the service session.

16. The apparatus of claim 15, further comprising means for receiving the SSO cookie from the user equipment, the SSO cookie indicating the service session for the user.

17. The apparatus of claim 16, further including means for verifying whether the service session is received from the user equipment and indexing an active master session for the user in order to determine if a previous SSO authentication is still valid.

18. The apparatus of claim 13, further comprising means for downloading an SSO plug-in towards the user equipment, the SSO plug-in running for confirming back the second user shared key.

19. The apparatus of claim 13, wherein the means for confirming includes means for receiving from the user equipment a second key code obtainable by processing the second user shared key at the user equipment.

20. The apparatus of claim 19, wherein the means for checking whether a second user shared key derived at the user equipment matches the first user shared key included in the master session, comprises means for processing the first user shared key to obtain a first key code to be matched against the second key code originated from the user equipment.

21. A user equipment usable by a user with a subscription in a telecommunication core network, and arranged to access Single Sign-On (SSO) services of a service network through an access network, the user equipment (UE) comprising:
- means for carrying out an authentication procedure to authenticate the user with an entity of the telecommunication core network, where the user holds the subscription, through the access network;
- means for computing a secret user key usable as cryptographic material;
- means for deriving from the cryptographic material a user shared key for SSO purposes;
- a repository for storing the user shared key; and
- means for confirming, upon accessing a service of the service network for a first time, the user shared key stored at the user equipment towards an entity of the service network, the user shared key being used by the entity of the service network to verify a match with another user shared key derived by the entity of the telecommunication core network to grant access to the service of the service network.

22. The user equipment of claim 21, wherein the means for confirming includes means for downloading an SSO plug-in from the entity of the service network (SN), the SSO plug-in running for confirming back the user shared key.

23. The user equipment of claim 21, wherein the means for confirming includes means for processing the user shared key to obtain a key code to be transmitted to the entity in the service network.

24. The user equipment of claim 21, further comprising means for receiving an SSO cookie from the entity in the service network, the SSO cookie indicating a service session and to be included in all further service requests from the user equipment as an SSO token.

* * * * *